US012562989B2

(12) United States Patent
Underwood

(10) Patent No.: US 12,562,989 B2
(45) Date of Patent: Feb. 24, 2026

(54) FLOW-TRIMMING BASED CONGESTION MANAGEMENT

(71) Applicant: Hewlett Packard Enterprise Development LP, Spring, TX (US)

(72) Inventor: Keith D. Underwood, Powell, TN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/479,803

(22) Filed: Oct. 2, 2023

(65) Prior Publication Data

US 2024/0121189 A1     Apr. 11, 2024

Related U.S. Application Data

(60) Provisional application No. 63/379,079, filed on Oct. 11, 2022.

(51) Int. Cl.
*H04L 47/11* (2022.01)
*H04L 47/10* (2022.01)
*H04L 47/122* (2022.01)

(52) U.S. Cl.
CPC ............ *H04L 47/11* (2013.01); *H04L 47/122* (2013.01); *H04L 47/39* (2013.01)

(58) Field of Classification Search
CPC ....... H04L 47/11; H04L 47/122; H04L 47/39; H04L 41/5022; H04L 47/24; H04L 47/10; H04L 69/22; H04L 47/32
See application file for complete search history.

(56) References Cited

U.S. PATENT DOCUMENTS

| | | | |
|---|---|---|---|
| 9,781,058 B1* | 10/2017 | Addepalli ............... | H04L 47/11 |
| 10,116,567 B1* | 10/2018 | Singh ...................... | H04L 12/18 |
| 2007/0257813 A1 | 11/2007 | Vaswani et al. | |
| 2009/0046815 A1* | 2/2009 | Oh ......................... | H04H 20/30 |
| | | | 375/340 |
| 2009/0300209 A1 | 12/2009 | Elzur | |
| 2010/0265821 A1* | 10/2010 | Schmidt .................. | H04L 49/30 |
| | | | 370/230 |
| 2012/0030451 A1* | 2/2012 | Pong ................... | G06F 9/30018 |
| | | | 712/E9.016 |
| 2012/0147750 A1* | 6/2012 | Pelletier .................. | H04L 47/31 |
| | | | 370/235 |
| 2012/0328092 A1 | 12/2012 | Kudo | |

(Continued)

*Primary Examiner* — Tonia L Dollinger
*Assistant Examiner* — Linh T. Nguyen
(74) *Attorney, Agent, or Firm* — Yao Legal Services, Inc.

(57) ABSTRACT

A piece of networking equipment facilitating efficient congestion management is provided. During operation, the equipment can receive, via a network, a plurality of packets that include portions of a data segment sent from a sender device to a receiver device. The equipment can identify, among the plurality of packets, one or more payload packets comprising payload of the data segment, and at least a header packet comprising header information of the data segment and a header-packet indicator. The equipment can determine whether congestion is detected at the receiver device based on a number of sender devices sending packets to the receiver device via the equipment. Upon determining congestion at the receiver device, the equipment can perform flow trimming by forwarding the header packet to the receiver device and dropping a subset of the one or more payload packets.

20 Claims, 11 Drawing Sheets

(56)  References Cited

U.S. PATENT DOCUMENTS

| | | | |
|---|---|---|---|
| 2014/0301195 A1* | 10/2014 | Briscoe | H04L 47/11 |
| | | | 370/230.1 |
| 2019/0140962 A1 | 5/2019 | Thottethodi et al. | |
| 2019/0171612 A1 | 6/2019 | Shahar et al. | |
| 2020/0084150 A1 | 3/2020 | Burstein et al. | |
| 2020/0127981 A1 | 4/2020 | Yang et al. | |
| 2020/0220713 A1 | 7/2020 | Li et al. | |
| 2020/0259799 A1 | 8/2020 | Li et al. | |
| 2020/0279060 A1 | 9/2020 | Mcgraw | |
| 2020/0374745 A1* | 11/2020 | Sayenko | H04W 28/0284 |
| 2021/0112002 A1* | 4/2021 | Pan | H04L 47/25 |
| 2022/0038371 A1* | 2/2022 | Raiciu | H04L 12/12 |
| 2022/0060418 A1* | 2/2022 | Le | H04L 45/38 |
| 2022/0103465 A1* | 3/2022 | Zhu | H04L 1/187 |
| 2022/0103484 A1 | 3/2022 | Penaranda et al. | |
| 2022/0124035 A1* | 4/2022 | Lee | H04L 43/0882 |
| 2022/0200801 A1 | 6/2022 | Potlapally et al. | |
| 2022/0413886 A1 | 12/2022 | Griffy et al. | |
| 2023/0084956 A1 | 3/2023 | Robison et al. | |
| 2023/0185606 A1 | 6/2023 | Menes et al. | |
| 2023/0281153 A1 | 9/2023 | Hansen | |
| 2023/0300063 A1* | 9/2023 | Naeimi | H04L 45/16 |
| | | | 370/390 |
| 2023/0336490 A1* | 10/2023 | Arslan | H04L 47/265 |
| 2023/0376450 A1 | 11/2023 | Ranadive et al. | |

* cited by examiner

START

RECEIVE HEADER PACKET
502

DETERMINE SEMANTIC
INFORMATION FROM HEADER
PACKET
504

IDENTIFY PAYLOAD PACKET
AWAITING RETRIEVAL BASED ON
SEMANTIC INFORMATION
506

SCHEDULE RETRIEVAL OF
PAYLOAD PACKET(S)
508

SEND TRANSMIT CREDITS TO
SENDER DEVICE AT SCHEDULED
TIME AND ALLOCATE BUFFER FOR
PAYLOAD PACKET(S)
510

RETURN

FLOW-TRIMMING BASED CONGESTION MANAGEMENT

RELATED APPLICATION

This application claims the benefit of U.S. Provisional Application No. 63/379,079, titled "Systems and Methods for Implementing Congestion Management and Encryption," by inventors Keith D. Underwood and Duncan Roweth, filed 11 Oct. 2022.

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

High-performance computing (HPC) can often facilitate efficient computation on the nodes running an application. HPC can facilitate high-speed data transfer between sender and receiver devices.

BRIEF DESCRIPTION OF THE FIGURES

In the figures, like reference numerals refer to the same figure elements.

DETAILED DESCRIPTION

Figure 1A:
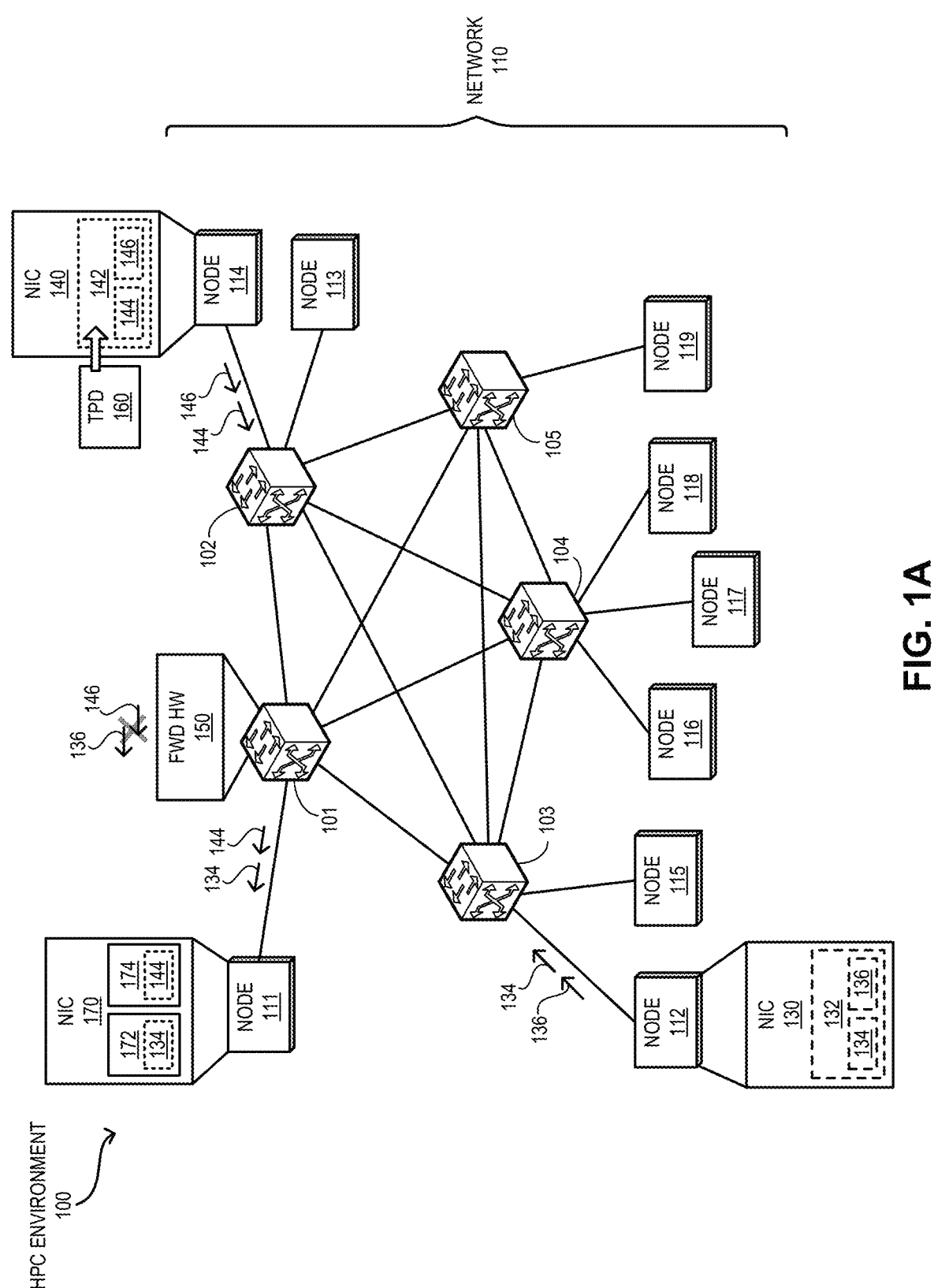
FIG. 1A illustrates an example of flow-trimming-based congestion management in a network, in accordance with an aspect of the present application.

As applications become progressively more distributed, HPC can facilitate efficient computation on the nodes running an application. An HPC environment can include compute nodes, storage nodes, and high-capacity switches coupling the nodes. Hence, the HPC environment can include a high-bandwidth and low-latency network formed by the switches. Typically, the compute nodes can be formed into a cluster. The cluster can be coupled to the storage nodes via a network. The compute nodes may run one or more applications run in parallel in the cluster. The storage nodes can record the output of computations performed on the compute nodes. Therefore, the compute and storage nodes can operate in conjunction with each other to facilitate high-performance computing.

To ensure the expected performance level, a respective node needs to operate at the operating rate of other nodes. For example, a storage node needs to receive a piece of data from a compute node as soon as the compute node generates the data. Here, the storage and compute nodes can operate as receiver and sender devices, respectively. On the other hand, if the compute node obtains a piece of data from a storage node, the storage and compute nodes can operate as sender and receiver devices, respectively. In some examples, an HPC environment can deploy Edge-Queued Datagram Service (EQDS), which can provide a datagram service to higher layers via dynamic tunnels in the network. EQDS can encapsulate Transmission Control Protocol (TCP) and remote direct memory access (RDMA) packets.

EQDS can use a credit-based mechanism where the receiver device can issue credits to the sender devices to control the packet retrieval. As a result, the switches in the network can avoid overutilization of buffers, ensuring that a standing queue never builds in the network. Transport protocols typically generate and exchange data flows. To allow a transport protocol instance to send its data flow, the sender device can maintain a queue or buffer for a data flow. Because the receiver device can issue credits to control the flow of data, the receiver device can control the queue. When many sender devices attempt to send data to a receiver device, an incast occurs in the network, leading to a high level of congestion at the receiver device. Therefore, a high-performance network, such a datacenter network, can require efficient congestion management, especially during incast, in the network to ensure high-speed data transfer.

The aspects described herein address the problem of efficient congestion management in a network by (i) generating separate packets for headers and payloads of transport layer data flows; and (ii) upon detecting congestion at a switch, dropping payload packets while forwarding header packets. The header packets can be significantly smaller than the payload packets and can include control information that can be indicative of the payload data to be followed. Therefore, the switch can deliver the header packets with low bandwidth utilization while ensuring that the receiver device is aware of the subsequent data. In this way, the switch can selectively drop packets to trim the flow to mitigate the congestion.

With existing technologies, data transfers from multiple sender devices to a receiver device can cause congestion and reduce the throughput of the data flows at the switches. Such a many-to-one communication pattern can be referred to as "incast." Typically, to mitigate the impact of congestion, a switch detecting the congestion can throttle traffic from the sender devices. For example, if EQDS is deployed in the network (e.g., a datacenter network), the sender device can become responsible for queueing. When a receiver device issues a transmit credit, the sender device sends a corresponding packet, thereby allowing the receiver device to partition its bandwidth among senders. To avoid congestion in the network, the switch can trim packets by removing the payload of the packets while preserving the headers.

Packet trimming includes forwarding the semantic information of a packet (e.g., the header) while dropping the payload. The semantic information can include information that can quantify the data in the payload and identify the distribution of the data (e.g., the number of bytes in the payload and the number of packets carrying the payload). However, the packets can be encrypted to ensure end-to-end security. Such a packet can include an Integrity Check Value (ICV) in a location of the packet (e.g., before or after the payload). Any modification to the packet can cause the ICV to be invalid. In particular, if a switch performs packet trimming, the receiver device may only receive the header of the packet. Since the ICV value is calculated based on the entire packet, the header information is insufficient to reproduce the ICV. Consequently, the receiver device would not be able to validate the packet.

To address this problem, when the NIC of the sender device receives a data segment from the upper layer (e.g., a TCP data segment), the NIC can synthesize a packet comprising semantic information of the segment. Since the header information of the data segment can include the semantic information, the synthesized packet can include the header information of the data segment. In particular, the semantic information can include all fields of the header of the data segment that can be used to quantify the data in the payload and identify the distribution of the data. The NIC can include a header-packet indicator in the packet. The indicator can mark the packet as a forwarding packet that should be forwarded to the receiver device. In other words, the indicator can mark this packet as "less favorable" for dropping (i.e., less likely to be dropped) if selective packet dropping is to occur due to network congestion. The NIC can also generate one or more payload packets comprising the payload of the segment. The NIC may not include the indicator in these packets, thereby indicating that these packets are "more favorable" for selective dropping.

The NIC can then generate the corresponding ICVs for each of these packets and individually encrypt the packets. Subsequently, the NIC can send the header packet to the receiver device. When a switch detects congestion in the network, instead of performing packet trimming, the switch can inspect the packets for the indicator and selectively drop the payload packets. The switch can detect the congestion based on the degree of incast at the receiver device. The degree of incast can indicate the number of sender devices sending packets to the receiver device. The switch can compare the current degree of incast at the receiver device, which can be determined by the number of flows to the receiver device through the switch, with a threshold value. The threshold value can indicate a predetermined number of sender devices sending packets to a receiver device. If the current degree of incast at the receiver device reaches the threshold value, the switch can determine congestion at the receiver device. However, the switch can continue to forward the header packets to the receiver device. The receiver device can validate the header packets with corresponding ICVs. Subsequently, the receiver device can schedule packets from different receiver devices based on the semantic information in the header packets. In this way, the semantic information for different flows can be forwarded to the receiver device while providing validation based on corresponding ICVs.

The receiver device can then obtain the data from the corresponding sender device at the scheduled time. Because the number of bytes in the semantic information is significantly smaller than the payload, the volume of traffic generated by the header packets can be relatively small. Hence, forwarding the header packets may not exacerbate the congestion and may not overwhelm the receiver device. Furthermore, the data awaiting transmission can be buffered at the corresponding sender devices. As a result, buffering can be avoided at the switches in the network. The receiver device can obtain the data from the sender devices at the scheduled time and mitigate congestion in the network.

In this disclosure, the term "switch" is used in a generic sense, and it can refer to any standalone networking equipment or fabric switch operating in any network layer. "Switch" should not be interpreted as limiting examples of the present invention to layer-2 networks. Any device or networking equipment that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of receiver-driven incast management using data retrieval, in accordance with an aspect of the present application. An HPC environment 100 can include a number of nodes 111, 112, 113, 114, 115, 116, 117, 118, and 119. A subset of these nodes can be compute nodes, while the others can be storage nodes. The nodes can be coupled to each other via a network 110. A respective node can operate as a receiver or sender device. The node can then be referred to as a receiver or sender device, respectively. Network 110 can include a set of high-capacity networking equipment, such as switches 101, 102, 103, 104, and 105. Here, network 110 can be an HPC fabric. The compute and storage nodes can operate in conjunction with each other through network 110 to facilitate high-performance computing in HPC environment 100.

A subset of the switches in network 110 can be coupled to each other via respective tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in network 110 can be formed over an underlying network (or an underlay network). The underlying network can be a physical network, and a respective link of the underlying network can be a physical link. A respective switch pair in the underlying network can be a Border Gateway Protocol (BGP) peer. A VPN, such as an Ethernet VPN (EVPN), can be deployed over network 110.

To ensure the expected performance level, a respective node in HPC environment 100 can operate at the operating rate of other nodes. Suppose that node 111 operates as a receiver device. At least a subset of the rest of the nodes in environment 100 can then operate as sender devices. Switches 101, 102, 103, 104, and 105 can facilitate low-latency data transfer from a respective sender device to receiver device 111 at high speed. When a large number of sender devices attempt to send data to receiver device 111, an incast occurs in network 110, which can lead to a high level of congestion at receiver device 111 and associated switches. Therefore, to ensure high-speed data transfer, HPC environment 100 can require mechanisms to mitigate congestion during incast.

With existing technologies, switch 101 can detect the congestion caused by incast at receiver device 111. Switch 101 can detect the congestion based on the degree of incast at receiver device 111. The degree of incast can indicate the number of sender devices sending packets to receiver device 111. Switch 101 can compare the current degree of incast at receiver device 111, which can be determined by the number of flows to receiver device 111 through switch 101, with a threshold value. The threshold value can indicate a predetermined number of sender devices sending packets to a receiver device. If the current degree of incast at receiver device 111 reaches the threshold value, switch 101 can determine congestion at receiver device 111. To mitigate the impact of congestion, switch 101 can throttle traffic from sender devices 112 and 114. For example, if EQDS is deployed in network 119, sender devices 112 and 114 can become responsible for queueing or buffering. For example, a transport layer daemon (TPD) 160 running on sender device 114 can send a data flow to receiver device 111. Examples of TPD 160 can include, but are not limited to, a TCP daemon, a User Datagram Protocol (UDP) daemon, Stream Control Transmission Protocol (SCTP) daemon, Datagram Congestion Control Protocol (DCCP) daemon, AppleTalk Transaction Protocol (ATP) daemon, Fibre Channel Protocol (FCP) daemon, Reliable Data Protocol (RDP) daemon, and Reliable User Data Protocol (RUDP) demon.

Sender device 114 can then become responsible for buffering the data from the flow. Similarly, sender device 112 can then become responsible for buffering the local data from the flow. When receiver device 111 issues respective transmit credits, sender devices 112 and 114 can send corresponding packets, thereby allowing receiver device 111 to partition its bandwidth among senders. To avoid congestion in network 110, forwarding hardware 150 of switch 101 can trim packets by removing the payload of the packets while preserving the headers.

Forwarding hardware 150 can perform packet trimming by forwarding the header of a packet to receiver device 111 while dropping the payload. In this way, switch 101 can "trim" a packet. However, if the packet is encrypted to ensure end-to-end security, the packet can include an ICV in a location of the packet (e.g., before and after the payload). If forwarding hardware 150 modifies the packet by trimming the payload, the ICV in the packet can become invalid. In particular, because receiver device 111 may receive the header of the packet, and the ICV value is calculated based on the entire packet, receiver device 111 may not be able to reproduce the ICV. Consequently, receiver device 111 would not be able to validate the packet.

To address this problem, when NIC 140 of sender device 114 receives a data segment 142 from TPD 182, NIC 140 can synthesize a header packet 144 comprising the semantic information of segment 142. The semantic information can include the number of bytes in the payload of segment 142 and the number of packets carrying the payload. Since the header of segment 142 can include the semantic information of segment 142, NIC 140 can include the header information of segment 142 in packet 144. NIC 140 can include a header-packet indicator in packet 144. The indicator can mark packet 144 as a forwarding packet that should be forwarded to receiver device 111. In other words, the indicator can mark packet 144 as less favorable for dropping if selective packet dropping is to occur due to network congestion. NIC 140 can also generate a payload packet 146 comprising the payload of segment 142. NIC 140 may not include the indicator in packet 146, thereby indicating that packet 146 can be more favorable for selective dropping. NIC 140 can generate the corresponding ICVs for each of packets 144 and 146 and individually encrypt them.

Similarly, upon receiving a data segment 132, NIC 130 of sender device 112 can generate a header packet 134 with the indicator and a payload packet 136. If forwarding hardware 150 detects congestion in network 110, instead of performing packet trimming, forwarding hardware 150 can inspect packets 134 and 144 for the indicator. Based on the presence of the indicator, forwarding hardware 150 can forward header packets 134 and 144 to receiver device 111. Receiver device 111 can then validate header packets 134 and 144 with corresponding ICVs. A NIC 170 of receiver device 111 may store header packets 134 and 144 in ingress buffers 172 and 174, respectively. In this way, switch 101 can forward the semantic information for different flows to receiver device 111, which in turn, can validate header packets 134 and 144 based on corresponding ICVs.

NIC 170 can determine, based on the semantic information in header packets 134 and 144, that the data of payload packets 136 and 146, respectively, should be retrieved. For example, the semantic information can quantify the data in payload packets 136 and 146. NIC 170 can also determine that the data awaiting retrieval is buffered in NICs 130 and 140. Accordingly, NIC 170 can deploy a scheduling mechanism to schedule the retrieval of the data from NICs 130 and 140, respectively. Because the number of bytes in the semantic information of segments 132 and 142 is significantly smaller than the corresponding payloads, the volume of traffic generated by header packets 134 and 144 can be relatively small. Hence, forwarding header packets 134 and 144 may not exacerbate the congestion and may not overwhelm NIC 170. NIC 170 can issue credits to NICs 130 and 140 to initiate transmission of payload packets 136 and 146.

However, if the congestion persists, switch 101 may deploy selective dropping. When forwarding hardware 150 receives packets 136 and 146, instead of performing packet trimming, forwarding hardware 150 can inspect packets 136 and 146 for the indicator. Since the indicator is not present in packets 136 and 146, forwarding hardware 150 can drop packets 136 and 146, thereby trimming the corresponding flows. This allows switches in network 110 to drop any data packet of a flow while forwarding the headers without trimming individual packets. As a result, the corresponding ICV of a respective packet received at NIC 170 is not impacted by the flow trimming. Hence, NIC 170 can successfully validate packets while forwarding hardware 150 performs flow trimming.

Figure 1B:
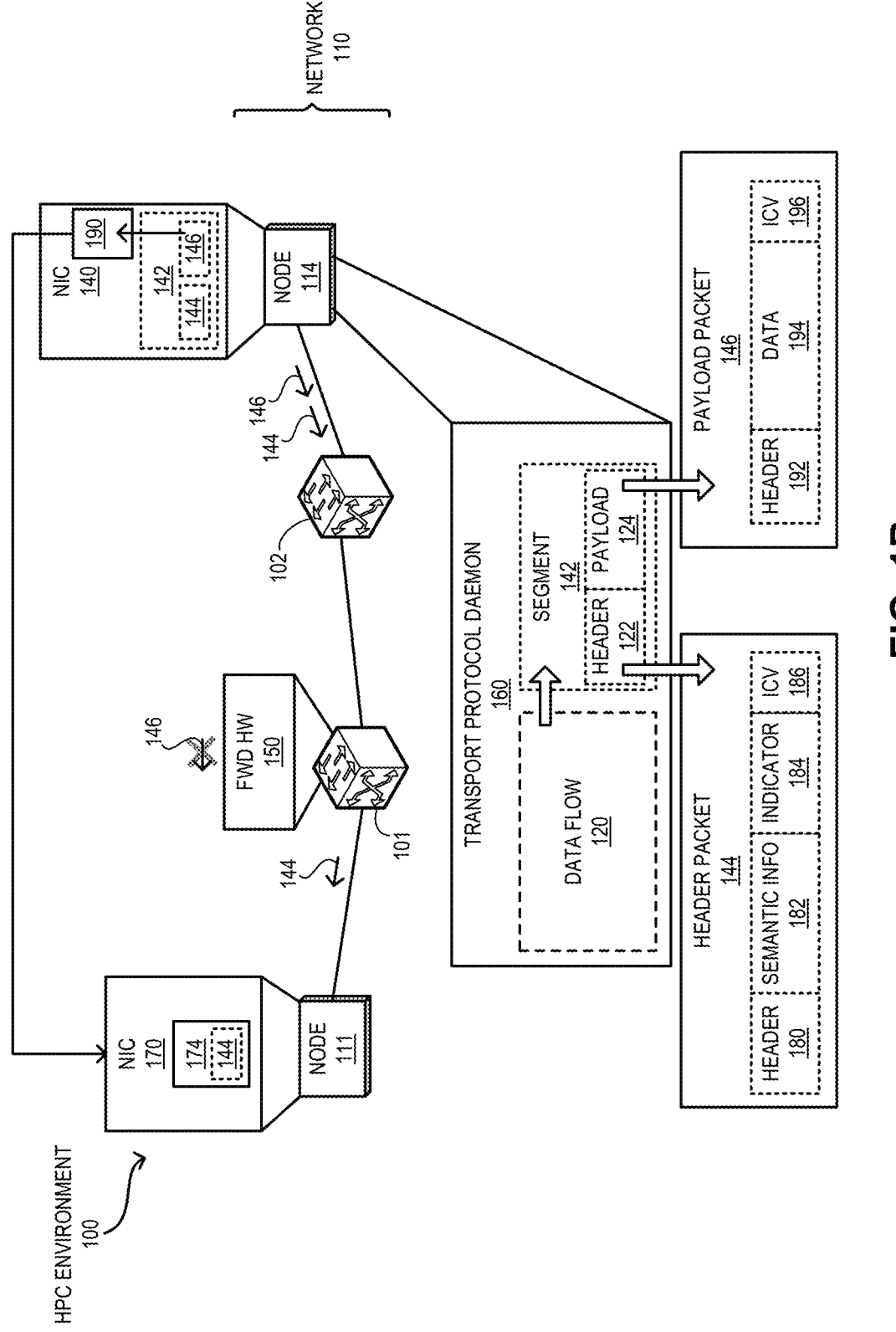
FIG. 1B illustrates examples of packets that facilitate flow-trimming-based congestion management, in accordance with an aspect of the present application.

FIG. 1B illustrates examples of packets that facilitate flow-trimming-based congestion management, in accordance with an aspect of the present application. During operation, TPD 160 can determine a data flow 120 (e.g., a transport layer flow, such as a TCP flow). TPD 160 can generate a data segment 142 from flow 120. Segment 142 can include a header 122 and a payload 124. Header 122 can include a set of header fields, which can include one or more of: source port, destination port, sequence number, acknowl-edgment number, header length, flags, urgent bits, acknowl-edgment bits, push indicator, connection reset, synch bits, finish bits, sliding window field, checksum, urgent pointer, and optional bits.

TPD 160 can provide segment 142 to NIC 140 to send it to receiver device 111. NIC 140 can generate a payload packet 146 comprising payload data 194 (i.e., the data to be transmitted) in payload 124. Payload packet 146 can include a header 192, which can be a copy of header 122. NIC 140 can then generate ICV 196 for payload packet 146 and encrypt payload packet 146. NIC 140 can then store payload packet 146 in a local buffer 190 associated with flow 120. In addition, NIC 140 can determine the semantic information 182 from header 122 and generate a header packet 144 comprising semantic information 182. Semantic information 182 can include parameter values from one or more fields of header 122. In particular, semantic information 182 can include all fields of header 122 that can be used to quantify the data in payload 124 and determine which portion of segment 142 corresponds to payload 124 (i.e., the distribu-tion of the payload of segment 142). Semantic information 182 can allow NIC 170 to schedule and obtain the data in payload 124 (e.g., using RDMA).

NIC 140 can also include a header-packet indicator 184 in header packet 144. Indicator 184 can be a separate field in header packet 144 or included in an optional field of header 122 that is included in semantic information 182. Indicator 184 can be represented by a predefined value. NIC 140 can then generate ICV 186 for header packet 144 while encrypt-ing packet 144. Header packet 144 can include a header 180, which can include a layer-3 header (e.g., an Internet Protocol (IP) header) and a layer-2 header (e.g., an Ethernet header). The source and destination addresses of the layer-3 header can correspond to the IP addresses of sender and receiver devices 114 and 111, respectively. The source and destina-tion addresses of the layer-2 header can correspond to the media access control (MAC) addresses of sender device 114 and locally coupled switch 102, respectively.

Based on the information in header 180, NIC 140 can send header packet 144 to switch 102. Subsequently, based on the information in header 180, switch 102 can forward header packet 144 to switch 101. If switch 101 detects congestion, switch 101 can determine whether header packet 144 includes indicator 184. When switch 101 determines the presence of indicator 184 in header packet 144, switch 101 determines that dropping of header packet 144 should be avoided, if possible. Accordingly, switch 101 can forward header packet 144 to receiver device 111 based on the information in header 180. Because NIC 170 can receive header packet 144 in its entirety (i.e., without trimming), NIC 170 can validate header packet 144 based on ICV 186.

NIC 170 can obtain semantic information 182 from header packet 144. Because header packet 144 can be validated, NIC 170 can consider semantic information 182 as trusted information. NIC 170 can then use semantic information 182 to determine the presence of a subsequent packet. Accordingly, NIC 170 can schedule the data retrieval and allocate transmit credits to NIC 140. Upon receiving the credits, NIC 140 can obtain payload packet 146 in accor-dance with the credits from buffer 190 and send payload packet 146 to receiver device 111. Because 184 is not included in payload packet 146, switch 101 (and switch 102) may drop payload packet 146 if flow trimming is initiated due to congestion. On the other hand, if switch 101 forwards payload packet 146, receiver device 111 can validate pay-load packet 146 using ICV 196 because payload packet 146 is delivered without trimming.

Figure 2A:
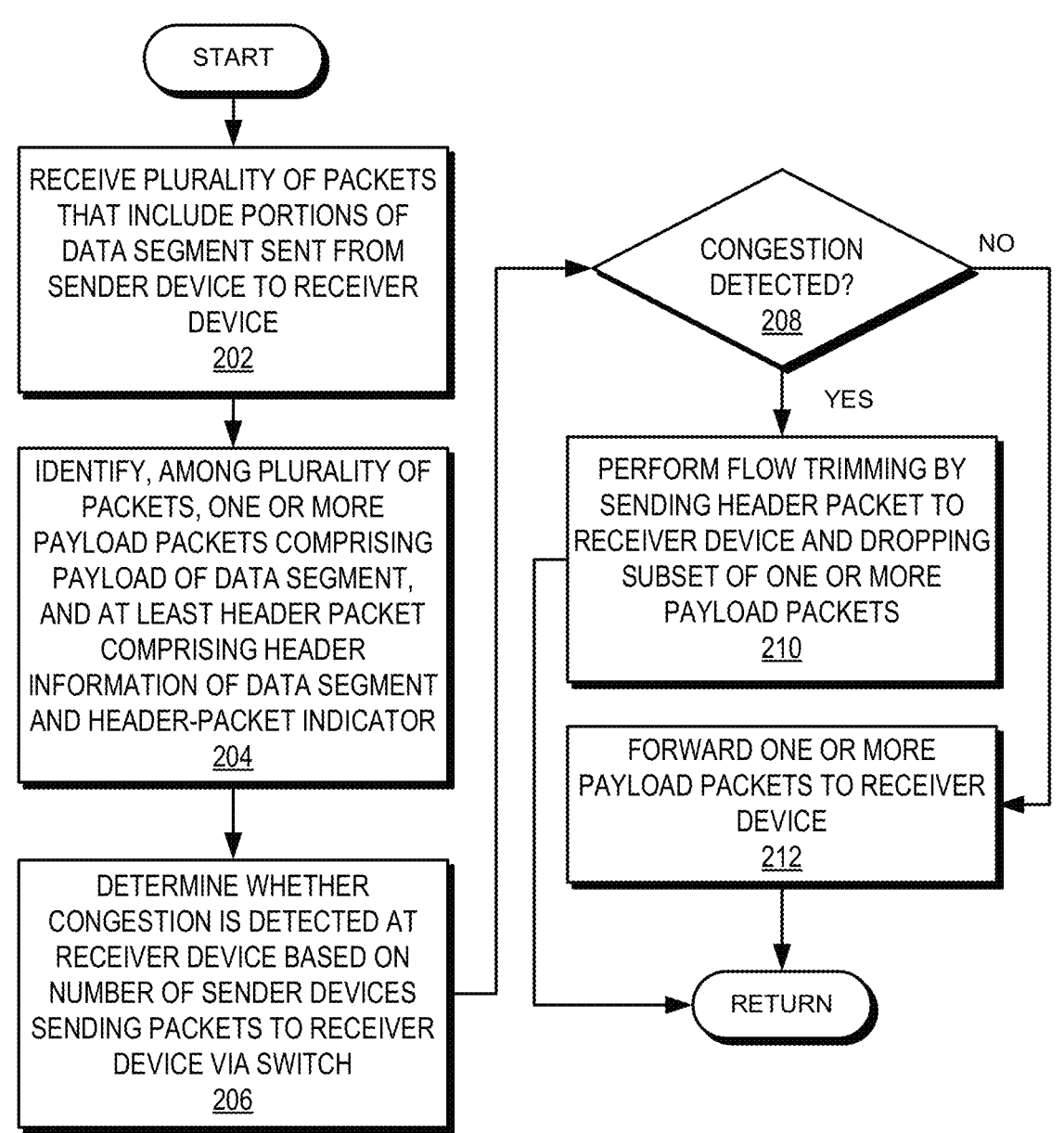
FIG. 2A presents a flowchart illustrating an example of a process of the forwarding hardware of a switch facilitating flow trimming, in accordance with an aspect of the present application.

FIG. 2A presents a flowchart illustrating an example of a process of the forwarding hardware of a switch facilitating flow trimming, in accordance with an aspect of the present application. During operation, the forwarding hardware can receive a plurality of packets that include portions of a data segment sent from a sender device to a receiver device (operation 202). To allow the switch to perform flow trim-ming, the sender device can generate the header and payload packets. The forwarding hardware can identify, among the plurality of packets, one or more payload packets compris-ing the payload of the data segment, and can at least a header packet comprising header information of the data segment and a header-packet indicator (operation 204). The forward-ing hardware can distinguish the header packet from the one or more payload packets based on an indicator in the header packet.

The forwarding hardware can determine whether conges-tion is detected at the receiver device based on the number of sender devices sending packets to the receiver device via the switch (operation 206). If the number of sender devices sending packets to the receiver device via the switch reaches a predetermined threshold value, the forwarding hardware may determine congestion at the receiver device. Upon determining congestion at the receiver device (operation 208), the forwarding hardware can perform flow trimming by sending the header packet to the receiver device and dropping a subset of the one or more payload packets (operation 210). If congestion is not detected, flow trimming may not be necessary. Accordingly, the forwarding hardware can forward the one or more payload packets to the receiver device (operation 212).

Figure 2B:
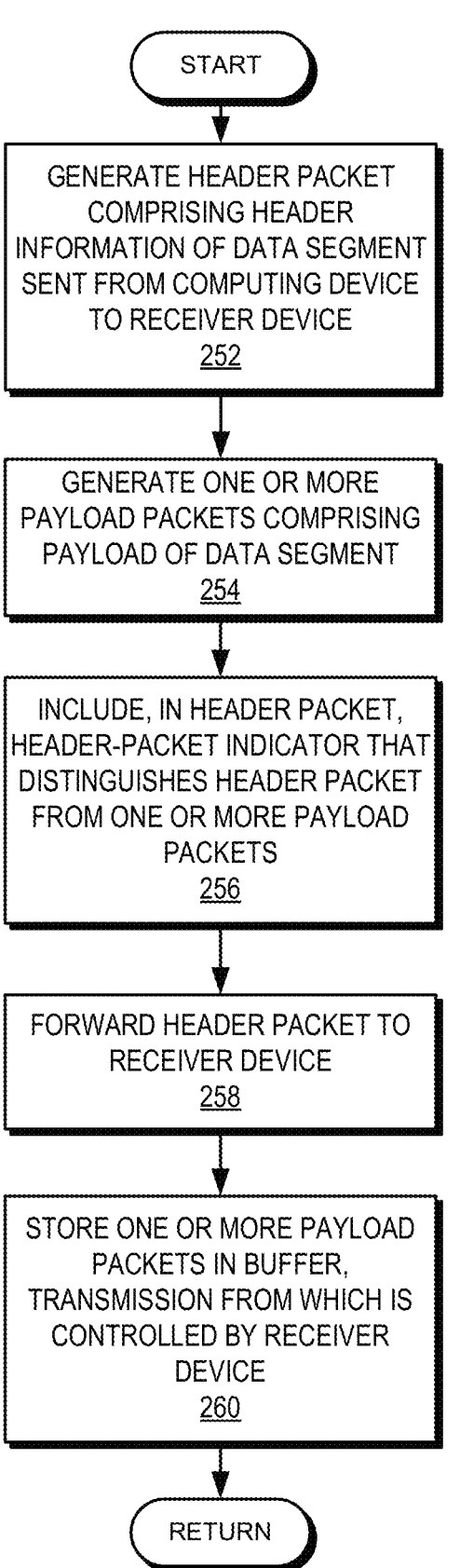
FIG. 2B presents a flowchart illustrating an example of a process of a network interface controller (NIC) of a computing device generating packets from a data segment, in accordance with an aspect of the present application.

FIG. 2B presents a flowchart illustrating an example of a process of a NIC of a computing device generating packets from a data segment, in accordance with an aspect of the present application. During operation, the NIC can generate a header packet comprising header information of a data segment sent from the computing device to a receiver device (operation 252). The data segment can be a transport layer data segment generated by a TPD running on the computing system. The NIC can include one or more fields of the header of the data segment in the header packet. The NIC may select the fields that are associated with the semantic information of the data segment for inclusion in the header packet. The NIC can also generate one or more payload packets comprising the payload of the data segment (opera-tion 254). The NIC can distribute the payload of the data segment among the one or more payload packets. For example, the NIC can determine the total number of bytes in the data segment and determine the maximum number of bytes a packet can accommodate. The NIC can then distrib-ute the payload of the data segment among the one or more payload packets accordingly.

The NIC can include, in the header packet, a header-packet indicator that distinguishes the header packet from the one or more payload packets (operation 256). Here, the header-packet indicator indicates that the header packet may not be dropped. On the other hand, the absence of the header-packet indicator in the one or more payload packets indicates that the one or more payload packets are allowed to be dropped. The NIC can then forward the header packet to the receiver device (operation 258). The NIC can store the one or more payload packets in a buffer, transmission from which is controlled by the receiver device (operation 260). The NIC can transmit from the buffer if the receiver device issues corresponding transmit credits.

Figure 3:
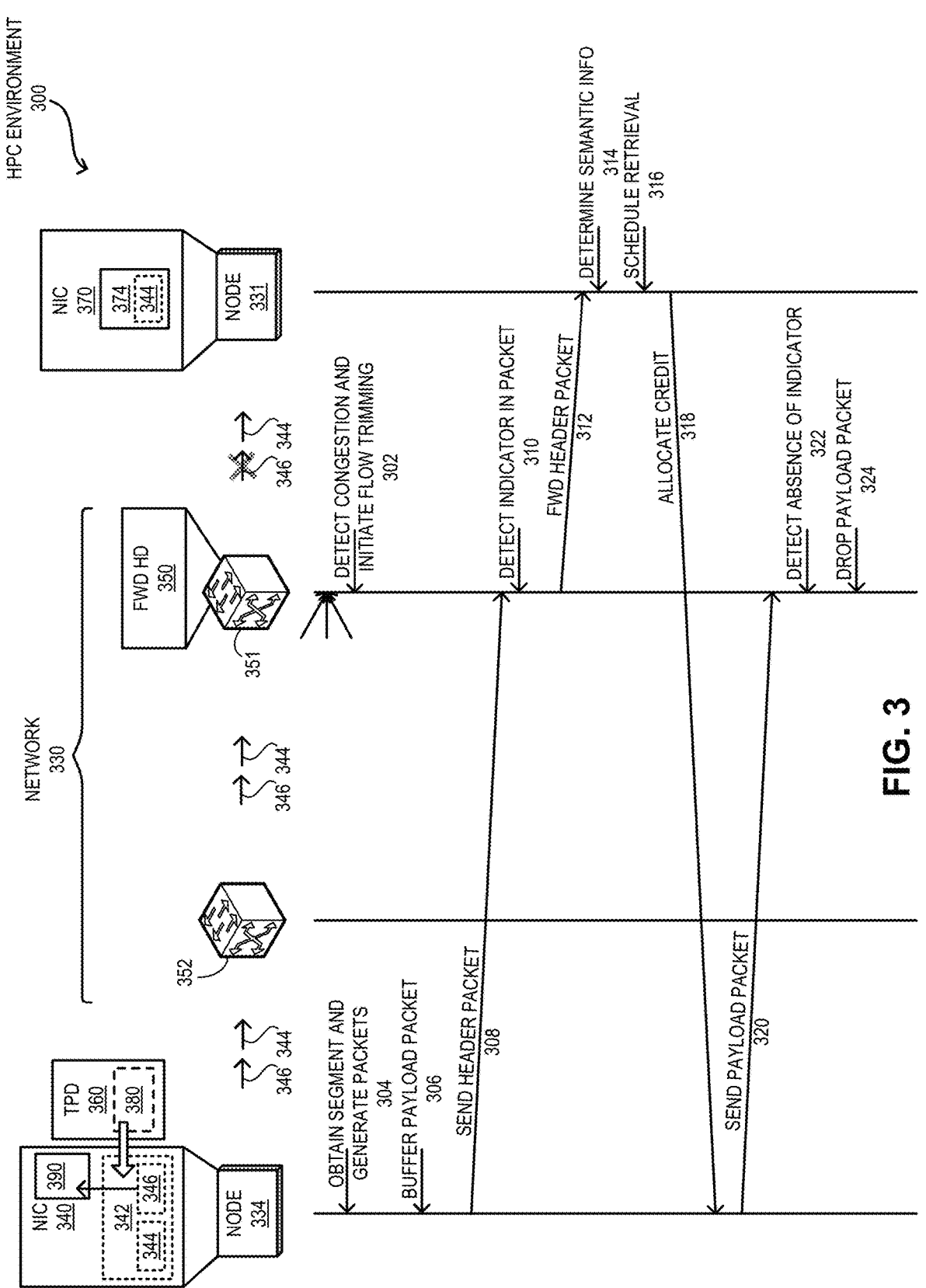
FIG. 3 illustrates an example of communication facilitating flow-trimming-based congestion management, in accordance with an aspect of the present application.

FIG. 3 illustrates an example of communication facilitating flow-trimming-based congestion management, in accordance with an aspect of the present application. An HPC environment 300 can include a network 330 comprising switches 351 and 352. Nodes 331 and 334 can operate as receiver and sender devices, respectively. During operation, switch 351 can detect congestion in network 330 and initiate flow trimming (operation 302). If the number of sender devices sending packets to receiver device 331 via switch 351 reaches a predetermined threshold value, switch 351 may determine congestion at receiver device 331. When NIC 340 of sender device 334 receives segment 342 of transport layer data flow 380 from TPD 360, NIC 340 can generate header packet 344 comprising header information of segment 342 and payload packet 346 comprising payload of segment 342 (operation 304). NIC 340 can include a payload-packet indicator in header packet 344, thereby indicating that packet 344 is less likely to be dropped when flow trimming is initiated. NIC 340 can buffer payload packet 346 (operation 306) and send header packet 344 (operation 308). Switch 352 can forward header packet 344 toward receiver device 331 via switch 351.

Upon receiving header packet 344, forwarding hardware 350 of switch 351 can parse header packet 344 and detect the indicator in header packet 344 (operation 310). Here, forwarding hardware 350 can check a predetermined location in payload packet 344 (e.g., in a header field) and determine that the location includes a predetermined value representing the indicator. Since the indicator indicates that header packet 344 is less likely to be dropped, upon identifying the indicator, forwarding hardware 350 can refrain from dropping header packet 344 and forward header packet 344 to receiver device 331 (operation 312). NIC 370 of receiver device 331 can then determine the semantic information from header packet 344 (operation 314). Because the semantic information quantifies the payload of segment 342 and indicates how the payload is distributed (e.g., in one payload packet), the semantic information allows NIC 370 to schedule the data retrieval (operation 316). For example, NIC 370 can issue transmit credit based on the number of bytes in payload packet 346. Accordingly, NIC 370 can allocate credits to sender device 334 and provide the credits to switch 351 for forwarding to sender device 334 (operation 318). The credits allow sender device 334 to forward packets to receiver device 331. Switches 351 and 352 can forward the credits to sender device 334. Upon receiving the credits, NIC 340 can send payload packet 346 to receiver device 331 (operation 320). When forwarding hardware 350 receives payload packet 346, forwarding hardware 350 can detect the absence of the indicator in payload packet 346 (operation 322). For example, forwarding hardware 350 can check the predetermined location for the indicator in payload packet 346 and determine that the location does not include a predetermined value representing the indicator. Therefore, forwarding hardware 350 can drop payload packet 346, thereby performing flow trimming on data flow 380.

Figure 4A:
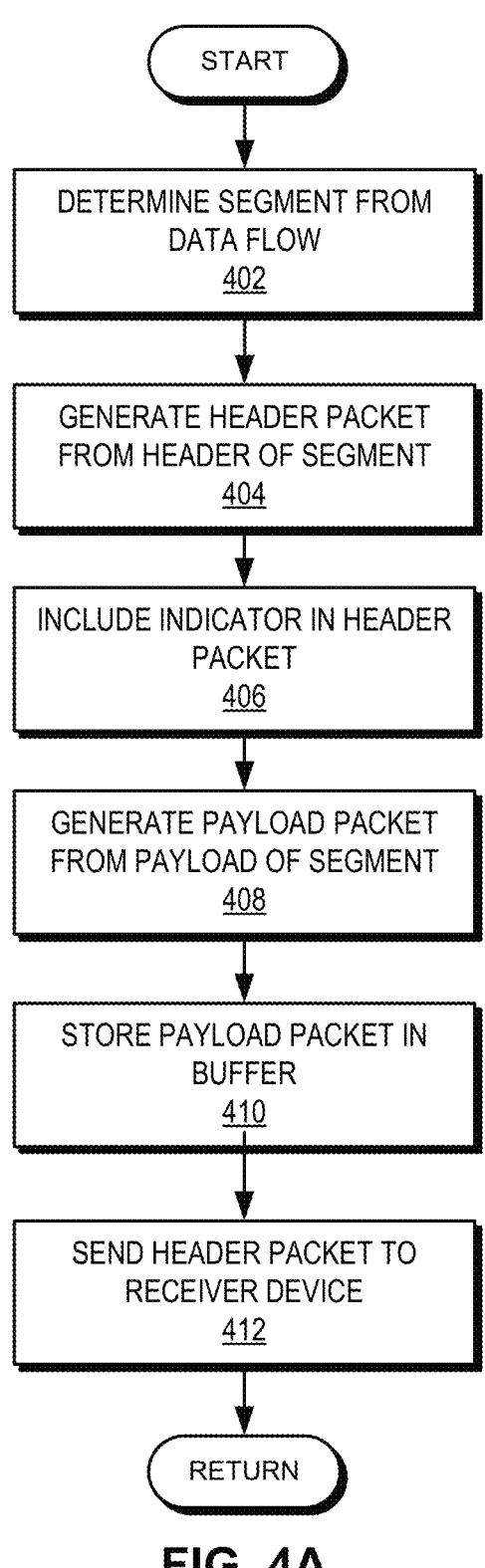
FIG. 4A presents a flowchart illustrating an example of a process of a sender device generating packets from a data flow, in accordance with an aspect of the present application.

FIG. 4A presents a flowchart illustrating an example of a process of a sender device generating packets from a data flow, in accordance with an aspect of the present application. During operation, the sender device can determine a data segment of a data flow (operation 402). The data segment can be issued from a TPD of the sender device through a network protocol stack. The NIC of the sender device may then obtain the data segment via the stack. The sender device can then generate a header packet from the header of the segment (operation 404) and include a header-packet indicator in the header packet (operation 406). The sender device can include one or more fields of the header of the data segment in the header packet. The sender device may select the fields that are associated with the semantic information of the data segment for inclusion in the header packet. The indicator can indicate that the header packet is less likely to be dropped. The sender device can also generate a payload packet from the payload of the segment (operation 408) and store the payload packet in a local buffer (e.g., in the NIC) (operation 410). The sender device can determine the total number of bytes in the data segment and determine the maximum number of bytes a packet can accommodate. The sender device can then include the payload of the data segment at least in the payload packet. The transmission from the buffer can be dependent upon transmit credits issued by the receiver device. The sender device can send the header packet to the receiver device (operation 412).

Figure 4B:
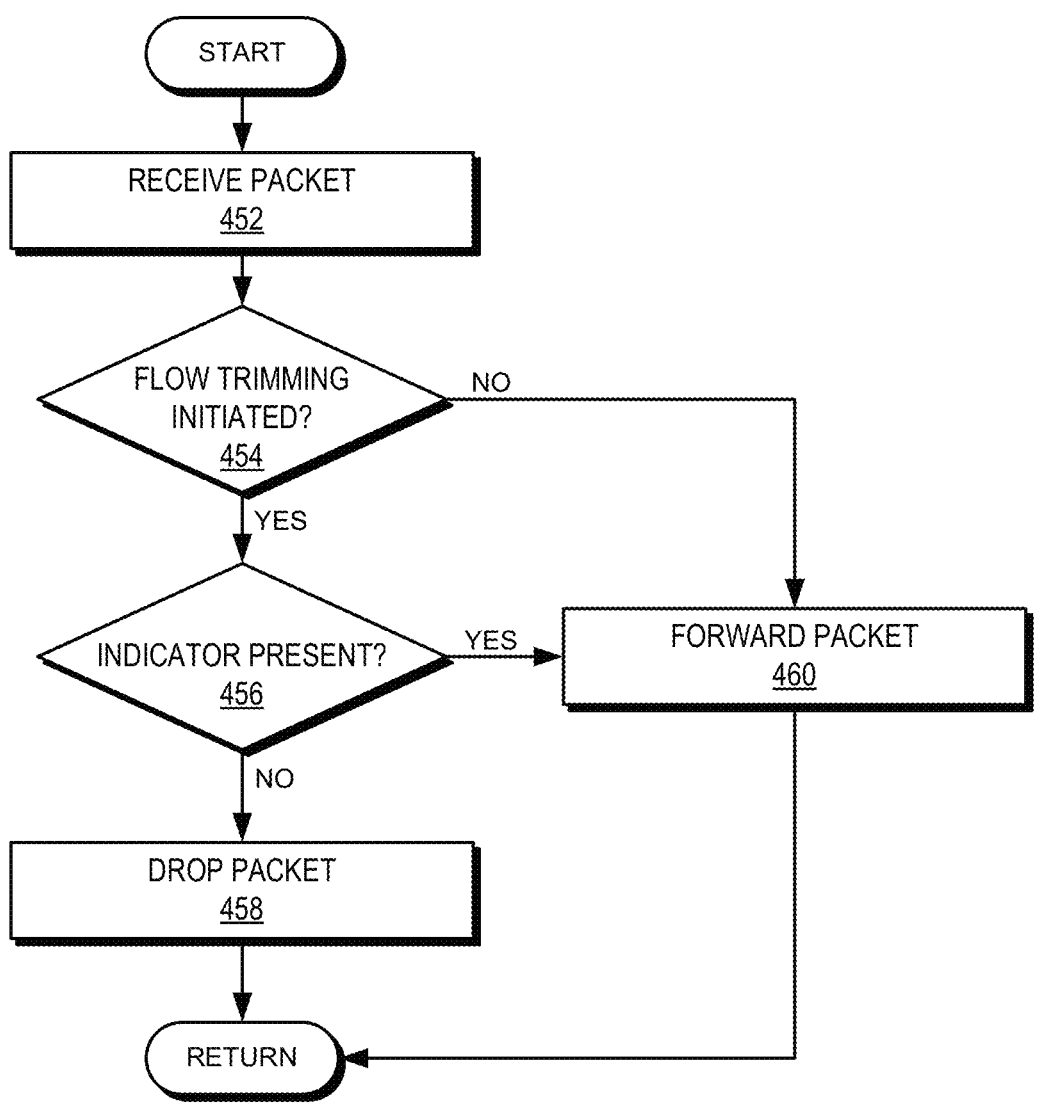
FIG. 4B presents a flowchart illustrating an example of a process of a switch processing applying flow trimming to packets, in accordance with an aspect of the present application.

FIG. 4B presents a flowchart illustrating an example of a process of a switch processing applying flow trimming to packets, in accordance with an aspect of the present application. During operation, the switch can receive a packet (operation 452) and determine whether flow trimming is initiated (operation 454). The flow trimming can be initiated if congestion is detected at the receiver device. If the number of sender devices sending packets to the receiver device via the switch reaches a predetermined threshold value, the switch may detect congestion at the receiver device. If flow trimming is initiated, the switch can start looking for packets that can be dropped. Accordingly, the switch can determine whether a header-packet indicator is present in the packet (operation 456). If flow trimming is not initiated (operation 454) or the indicator is present (operation 456), the switch can forward the packet (operation 460). On the other hand, if the indicator is not present in the packet, the switch can determine that dropping is allowed for the packet. Hence, the switch can drop the packet (operation 458).

Figure 5:
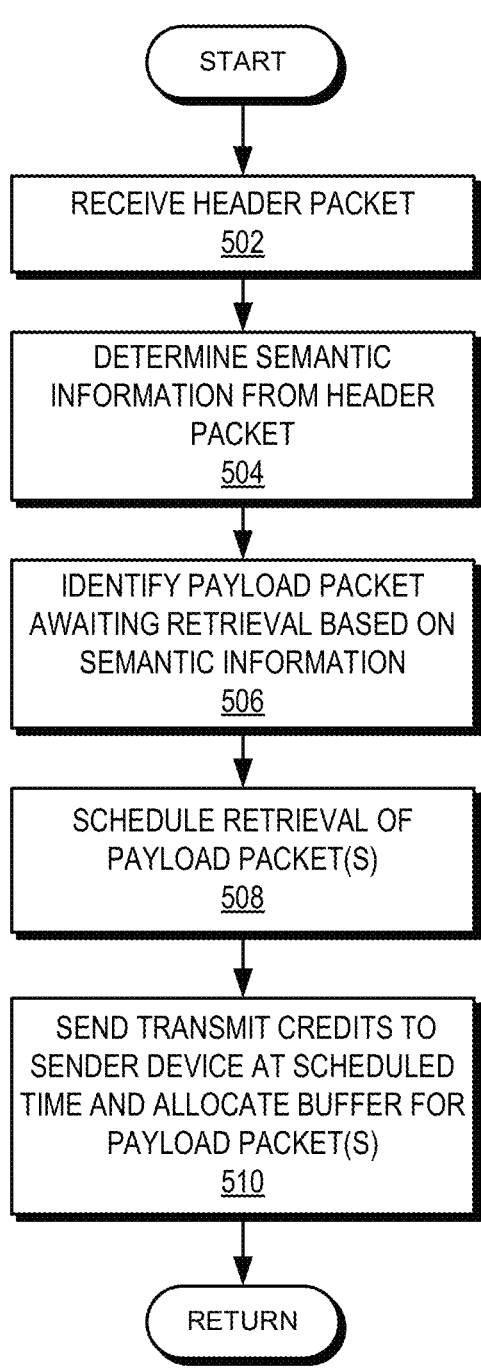
FIG. 5 presents a flowchart illustrating an example of a process of a receiver device processing packets, in accordance with an aspect of the present application.

FIG. 5 presents a flowchart illustrating an example of a process of a receiver device processing packets, in accordance with an aspect of the present application. During operation, the receiver device can receive a header packet (operation 502) and determine semantic information from the header packet (operation 504). The semantic information can include information from one or more fields of a header of a data segment. The semantic information can indicate the number of bytes of the data segment to be retrieved from the sender device and how the bytes are distributed (e.g., across how many packets). The receiver device can then identify the payload packet(s) awaiting retrieval based on the semantic information (operation 506) and schedule the retrieval of the payload packet (operation 508). The semantic information can indicate the number of payload packets and the payload bytes in the payload packets. The receiver device can schedule the retrievals in such a way that the retrievals do not cause congestion at the receiver device. Based on the schedule, the receiver device can send transmit credits to the sender device at the scheduled time and allocate a buffer for the payload packet(s) (operation 510). Since the sender device can only transmit packets upon receiving transmit credits, the receiver device can manage when to receive traffic from the sender device by scheduling the retrievals and sending transmit credits accordingly.

Figure 6:
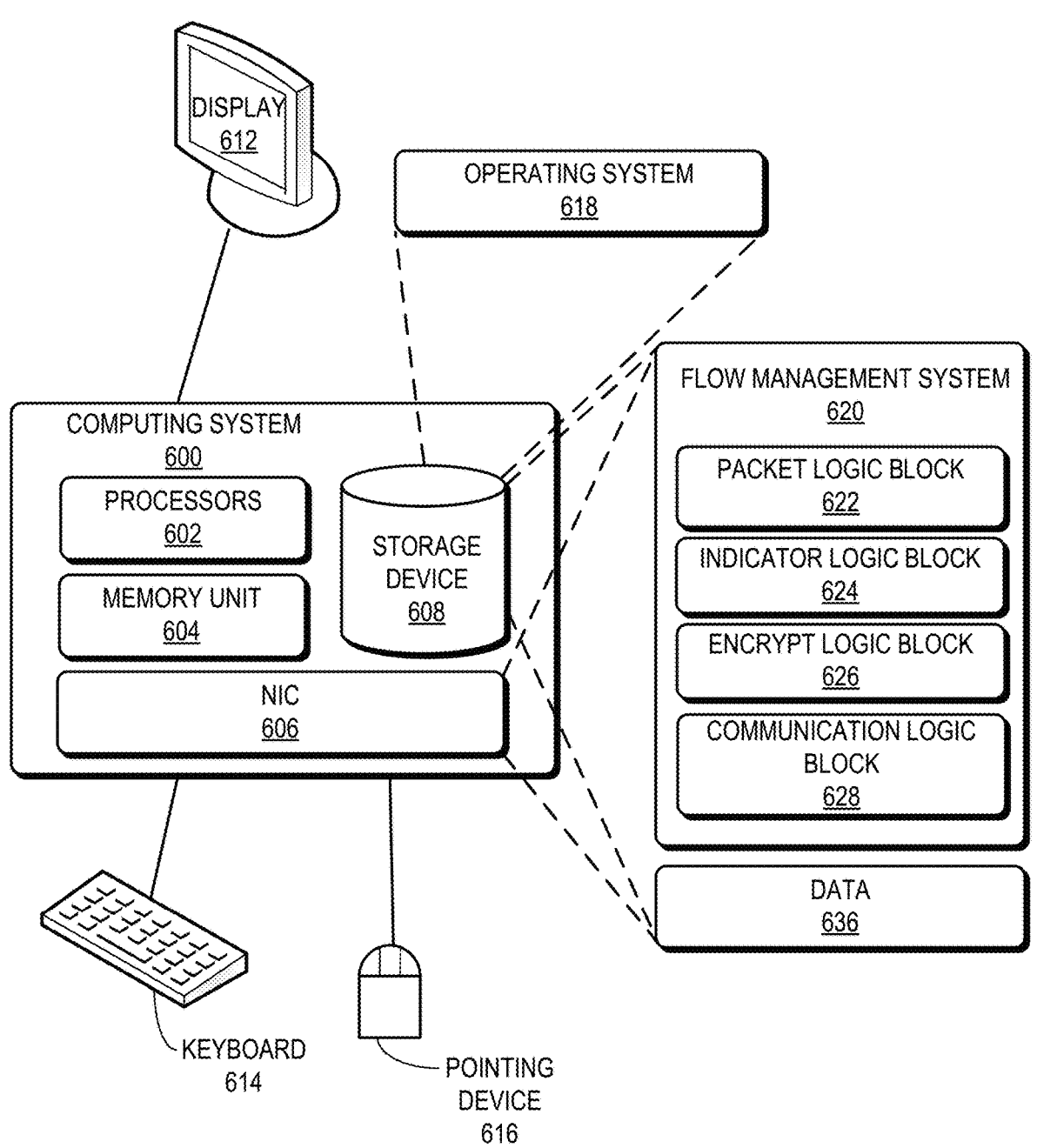
FIG. 6 illustrates an example of a computing system facilitating flow-trimming-based congestion management, in accordance with an aspect of the present application.

FIG. 6 illustrates an example of a computing system facilitating flow-trimming-based congestion management, in accordance with an aspect of the present application. A computing system 600 can include a set of processors 602, a memory unit 604, a NIC 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage device 608 can store an operating system 618. A flow management system 620 and data 636 associated with flow management system 620 can be maintained and executed from storage device 608 and/or NIC 606.

Flow management system 620 can include instructions, which when executed by computing system 600, can cause computing system 600 to perform methods and/or processes described in this disclosure. Specifically, if computing system 600 is a sender device, flow management system 620 can include instructions for generating header and payload packets from a data segment (packet logic block 622). Flow management system 620 can also include instructions for including an indicator in the header packet (indicator logic block 624). Flow management system 620 can include instructions for generating respective ICVs for the header and payload packets (encryption logic block 626). Flow management system 620 can include instructions for encrypting the header and payload packets (encryption logic block 626).

If computing system 600 is a receiver device, flow management system 620 can include instructions for sending transmit credits to a sender device (packet logic block 622). Flow management system 620 can then include instructions for determining the presence of an indicator in a packet (indicator logic block 624). Flow management system 620 can also include instructions for validating a respective packet based on a corresponding ICV (encryption logic block 626).

Flow management system 620 may further include instructions for sending and receiving packets (communication logic block 628). Data 636 can include any data that can facilitate the operations of flow management system 620. Data 636 can include, but is not limited to, semantic information of a data segment, payload data to be transmitted, header and payload packets, and an indicator.

Figure 7:
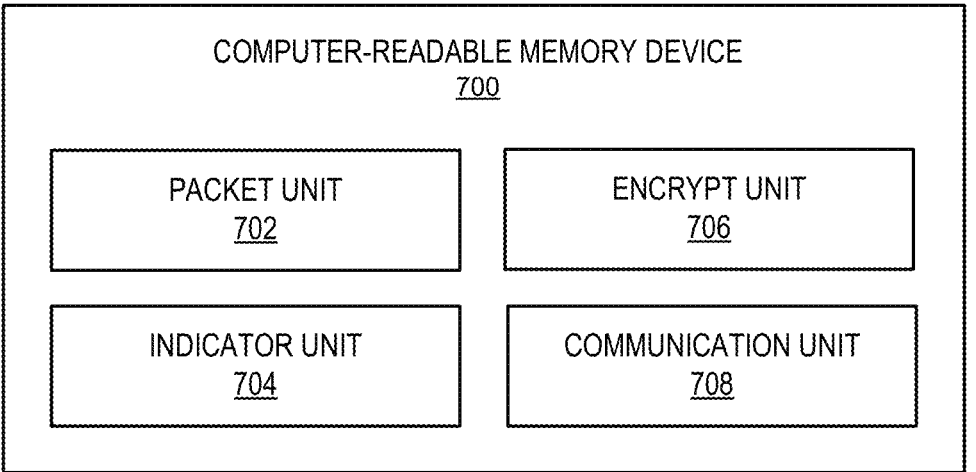
FIG. 7 illustrates an example of a computer-readable memory device that facilitates flow-trimming-based congestion management, in accordance with an aspect of the present application.

FIG. 7 illustrates an example of a computer-readable memory device that facilitates flow-trimming-based congestion management, in accordance with an aspect of the present application. Computer-readable memory device 700 can comprise a plurality of units or apparatuses which may communicate with one another via a wired, wireless, quantum, light, or electrical communication channel. Memory device 700 may be realized using one or more integrated circuits, and may include fewer or more units or apparatuses than those shown in FIG. 7.

Further, memory device 700 may be integrated with a computer system, or integrated in a device that is capable of communicating with other computer systems and/or devices. For example, memory device 700 can be NIC in a computer system. Memory device 700 can comprise units 702-708, which perform functions or operations similar to logic blocks 622-628 of flow management system 620 of FIG. 6, including: a packet unit 702; an indicator unit 704, an encrypt unit 706; and a communication unit 708.

Figure 8:
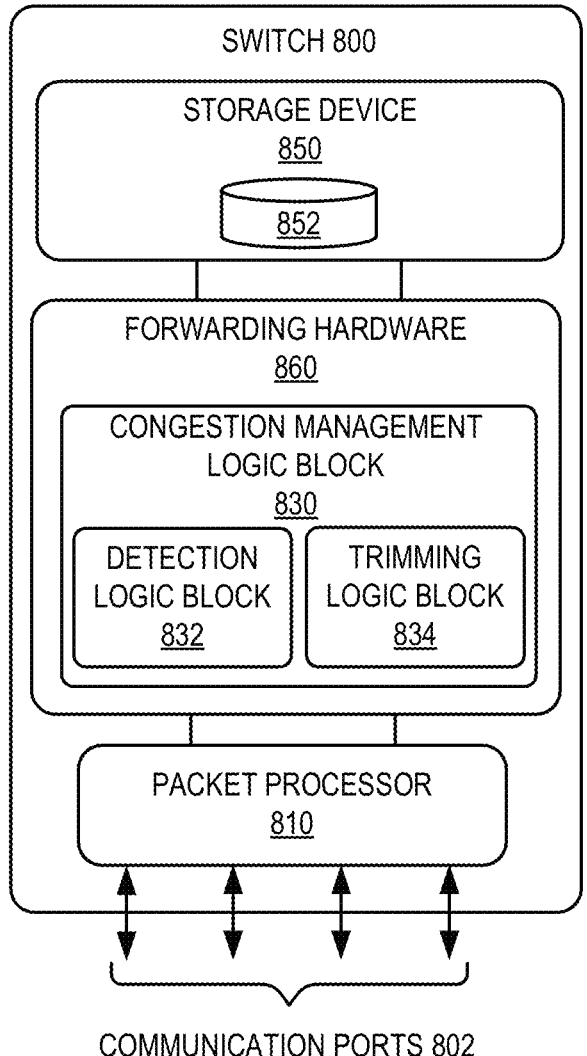
FIG. 8 illustrates an example of a switch supporting flow-trimming-based congestion management, in accordance with an embodiment of the present application.

FIG. 8 illustrates an example of a switch supporting flow-trimming-based congestion management, in accordance with an embodiment of the present application. A switch 800, which can also be referred to as networking equipment 800, can include a number of communication ports 802, a packet processor 810, and a storage device 850. Switch 800 can also include forwarding hardware 860 (e.g., processing hardware of switch 800, such as its application-specific integrated circuit (ASIC) chips), which includes information based on which switch 800 processes packets (e.g., determines output ports for packets). Packet processor 810 extracts and processes header information from the received packets. Packet processor 810 can identify a switch identifier (e.g., a MAC address and/or an IP address) associated with switch 800 in the header of a packet.

Communication ports 802 can include inter-switch communication channels for communication with other switches and/or user devices. The communication channels can be implemented via a regular communication port and based on any open or proprietary format. Communication ports 802 can include one or more Ethernet ports capable of receiving frames encapsulated in an Ethernet header. Communication ports 802 can also include one or more IP ports capable of receiving IP packets. An IP port is capable of receiving an IP packet and can be configured with an IP address. Packet processor 810 can process Ethernet frames and/or IP packets. A respective port of communication ports 802 may operate as an ingress port and/or an egress port.

Switch 800 can maintain a database 852 (e.g., in storage device 850). Database 852 can be a relational database and may run on one or more database management system (DBMS) instances. Database 852 can store information associated with routing and configuration associated with switch 800. Forwarding hardware 860 can include a congestion management logic block 830 that facilitates flow trimming in a network. Congestion management logic block 830 can include a detection logic block 832 and a trimming logic block 834. Congestion management logic block 830 can determine whether there is congestion at a receiver device. If the number of sender devices sending packets to the receiver device via switch 800 reaches a predetermined threshold value, congestion management logic block 830 may determine congestion at the receiver device. Upon detecting congestion, congestion management logic block 830 can initiate flow trimming at switch 800. Detection logic block 832 can detect whether a packet received via one of ports 802 includes a header-packet indicator. Trimming logic block 834 can, during congestion, drop a payload packet if the payload packet does not include the indicator while forwarding the header packet.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a piece of networking equipment facilitating efficient congestion management. During operation, the forwarding hardware of the networking equipment can receive, via a network, a plurality of packets that include portions of a data segment sent from a sender device to a receiver device. The forwarding hardware can identify, among the plurality of packets, one or more payload packets comprising the payload of the data segment, and at least a header packet comprising header information of the data segment and a header-packet indicator. The forwarding hardware can determine whether congestion is detected at the receiver device based on a number of sender devices sending packets to the receiver device via the networking equipment. Upon determining congestion at the receiver device, the forwarding hardware can perform flow trimming by sending the header packet to the receiver device and dropping a subset of the one or more payload packets.

In a variation on this aspect, the forwarding hardware can distinguish the header packet from the one or more payload packets based on the header-packet indicator.

In a further variation, if the congestion is not detected, the forwarding hardware can forward the one or more payload packets to the receiver device.

In a variation on this aspect, the header information can include semantic information that quantifies the payload of the data segment and indicates distribution of the payload.

In a further variation, the forwarding hardware can receive transmit credits from the receiver device. Here, the transmit credits can correspond to the one or more payload packets and can be generated based on the semantic information. Subsequently, the forwarding hardware can send the transmit credits to the sender device.

In a variation on this aspect, the data segment can be a transport layer data segment generated at the sender device.

In a variation on this aspect, the networking equipment can be in the network coupling the sender device and the receiver device.

Another aspect of the present technology can provide a computing system facilitating efficient congestion management. During operation, a NIC of the computing system can generate a header packet comprising header information of a data segment sent from the computing system to a receiver device. The NIC can also generate one or more payload packets comprising payload of the data segment. The NIC can then include, in the header packet, a header-packet indicator that distinguishes the header packet from the one or more payload packets. Subsequently, the NIC can forward the header packet to the receiver device and store the one or more payload packets in a buffer, transmission from which can be controlled by the receiver device.

In a further variation, the header information can include semantic information that quantifies the payload of the data segment and indicates distribution of the payload.

In a further variation, the NIC can receive transmit credits from the receiver device. The transmit credits can correspond to the one or more payload packets and are generated based on the semantic information.

In a further variation, the NIC can determine a subset of the one or more payload packets corresponding to the transmit credits. The apparatus can then send the subset of the one or more payload packets to the receiver device.

In a variation on this aspect, the absence of the header-packet indicator in the one or more payload packets indicates that the one or more payload packets are allowed to be dropped.

In a variation on this aspect, the data segment can be a transport layer data segment generated at the computing system.

In a variation on this aspect, the NIC can individually encrypt the header packet and the one or more payload packets.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   receiving, by a piece of networking equipment in a network coupling a sender device and a receiver device, a plurality of packets associated with a data segment sent from the sender device and destined for the receiver device;
   identifying, by the networking equipment among the plurality of packets, at least a header packet and one or more payload packets, a respective payload packet comprising payload, which includes a corresponding portion of the data segment, and the header packet comprising a header-packet indicator and header information of the data segment;
   determining, by the networking equipment, whether congestion is detected at the receiver device based on a number of sender devices sending packets to the receiver device via the networking equipment; and
   in response to detecting congestion at the receiver device, performing flow trimming on the data segment by:
      distinguishing the header packet from the one or more payload packets based on the header-packet indicator;
      forwarding the entire header packet to the receiver device; and
      dropping a subset of the one or more payload packets.

2. The method of claim 1, wherein identifying the one or more payload packets further comprises:
   detecting, in each of the one or more payload packets, absence of the header-packet indicator.

3. The method of claim 1, wherein, in response to not detecting the congestion, the method further comprises forwarding the one or more payload packets to the receiver device.

4. The method of claim 1, wherein the header information in the header packet comprises semantic information that quantifies the payload of the data segment and indicates distribution of the payload among the one or more payload packets.

5. The method of claim 4, further comprising:

receiving transmit credits from the receiver device, wherein the transmit credits correspond to the one or more payload packets and are generated based on the semantic information in the header packet; and sending the transmit credits to the sender device.

6. The method of claim 1, wherein the data segment is a transport layer data segment generated at the sender device.

7. The method of claim 1, wherein the networking equipment is in a network coupling the sender device and the receiver device.

8. A piece of networking equipment, comprising:

a memory device; and forwarding hardware to:

receive a plurality of packets associated with a data segment sent from a sender device and destined for a receiver device;

identify, among the plurality of packets, at least a header packet and one or more payload packets, a respective payload packet comprising payload, which includes a corresponding portion of the data segment, and the header packet comprising a header-packet indicator and header information of the data segment;

determine whether congestion is detected at the receiver device based on a number of sender devices sending packets to the receiver device via the networking equipment;

in response to detecting congestion at the receiver device, perform flow trimming on the data segment by:

distinguishing the header packet from the one or more payload packets based on the header-packet indicator;

sending the entire header packet to the receiver device; and dropping a subset of the one or more payload packets.

9. The networking equipment of claim 8, wherein, to identify the one or more payload packets, the forwarding hardware is further to:

detect, in each of the one or more payload packets, absence of the header-packet indicator.

10. The networking equipment of claim 8, wherein, in response to not detecting the congestion, the forwarding hardware is further to forward the one or more payload packets to the receiver device.

11. The networking equipment of claim 8, wherein the header information in the header packet comprises semantic information that quantifies the payload of the data segment and indicates distribution of the payload among the one or more payload packets.

12. The networking equipment of claim 11, wherein the forwarding hardware is further to:

receive transmit credits from the receiver device, wherein the transmit credits correspond to the one or more payload packets and are generated based on the semantic information in the header packet; and send the transmit credits to the sender device.

13. The networking equipment of claim 8, wherein the data segment is a transport layer data segment generated at the sender device.

14. The networking equipment of claim 8, wherein the networking equipment is in a network coupling the sender device and the receiver device.

15. A non-transitory computer-readable medium storing instructions which, when executed by forwarding hardware of a network device, cause the forwarding hardware to:

receive a plurality of packets associated with a data segment sent from a sender device and destined for a receiver device;

identify, among the plurality of packets, at least a header packet and one or more payload packets, a respective payload packet comprising payload, which includes a corresponding portion of the data segment, and the header packet comprising a header-packet indicator and header information of the data segment;

determine whether congestion is detected at the receiver device based on a number of sender devices sending packets to the receiver device via the networking equipment;

in response to detecting congestion at the receiver device, perform flow trimming on the data segment by:

distinguishing the header packet from the one or more payload packets based on the header-packet indicator;

sending the entire header packet to the receiver device; and dropping a subset of the one or more payload packets.

16. The non-transitory computer-readable medium of claim 15, wherein, to identify the one or more payload packets, the instructions cause the forwarding hardware to detect absence of the header-packet indicator in each of the one or more payload packets.

17. The non-transitory computer-readable medium of claim 15, wherein, in response to not detecting the congestion, the instructions cause the forwarding hardware to forward the one or more payload packets to the receiver device.

18. The non-transitory computer-readable medium of claim 15, wherein the header information in the header packet comprises semantic information that quantifies the payload of the data segment and indicates distribution of the payload among the one or more payload packets.

19. The non-transitory computer-readable medium of claim 18, wherein instructions cause the forwarding hardware to:

receive transmit credits from the receiver device, wherein the transmit credits correspond to the one or more payload packets and are generated based on the semantic information in the header packet; and send the transmit credits to the sender device.

20. The non-transitory computer-readable medium of claim 15, wherein the data segment is a transport layer data segment generated at the sender device.

* * * * *